April 12, 1955 C. L. RUSSELL ET AL 2,706,034
CONVEYOR MECHANISM FOR DOUGH FORMING MACHINES
Filed July 16, 1949 3 Sheets-Sheet 1
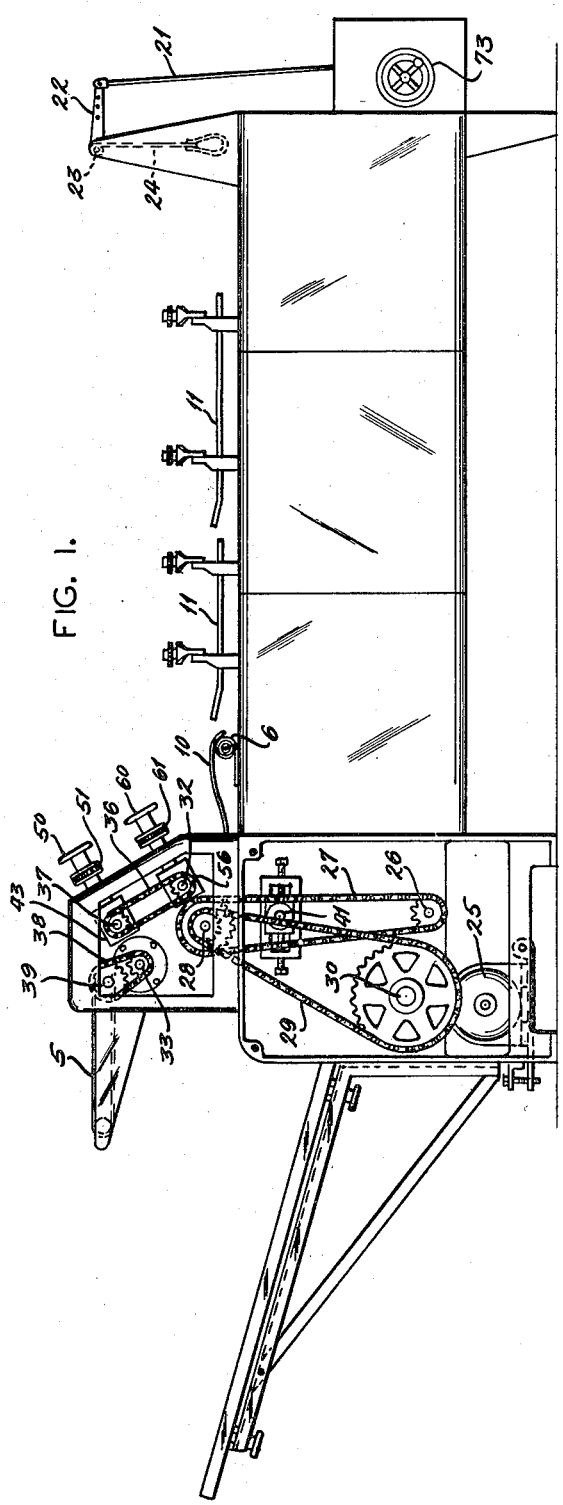
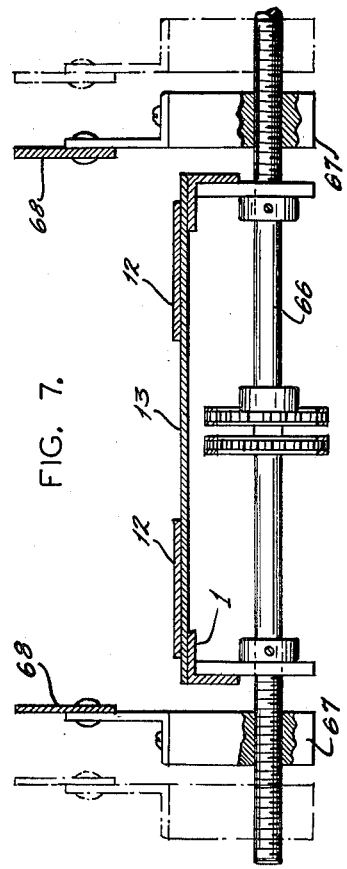
INVENTORS:
CHARLES L. RUSSELL
GUSTAVE H. STEINMEYER
BY
ATTORNEYS.

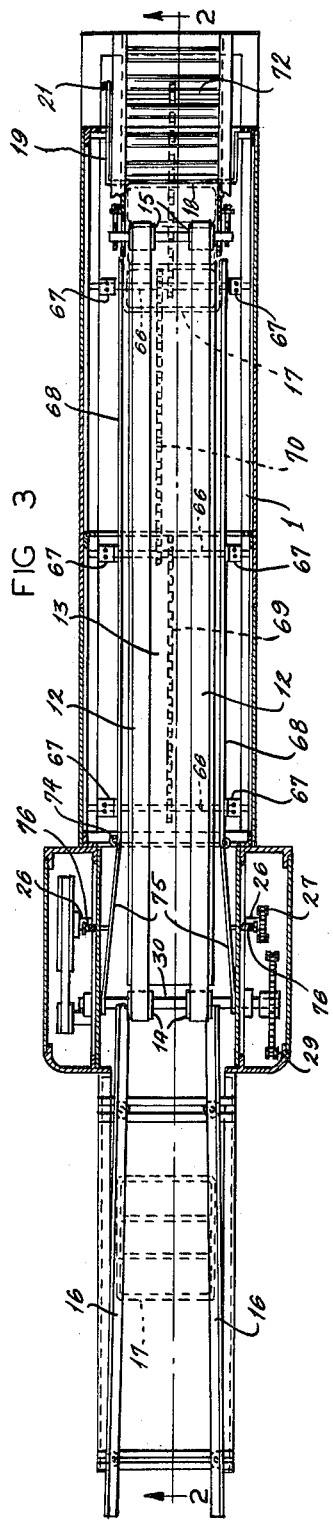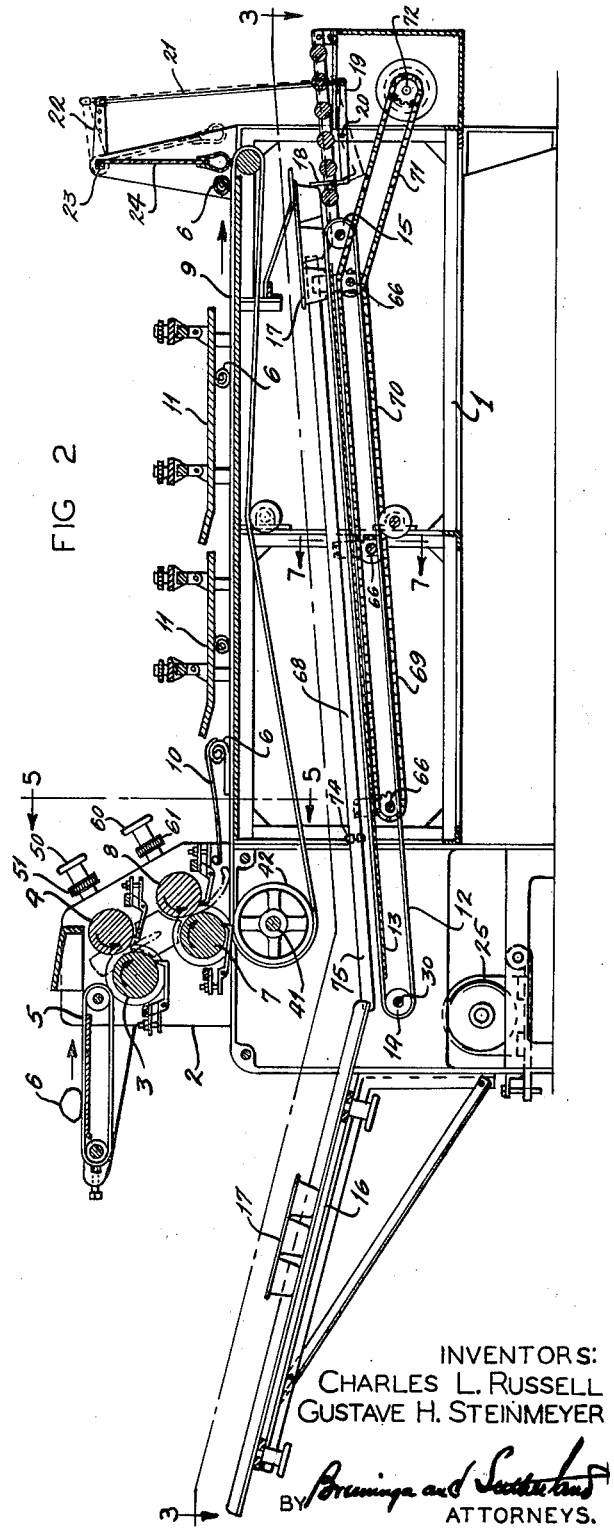
INVENTORS:
CHARLES L. RUSSELL
GUSTAVE H. STEINMEYER

April 12, 1955     C. L. RUSSELL ET AL     2,706,034
CONVEYOR MECHANISM FOR DOUGH FORMING MACHINES
Filed July 16, 1949     3 Sheets-Sheet 3
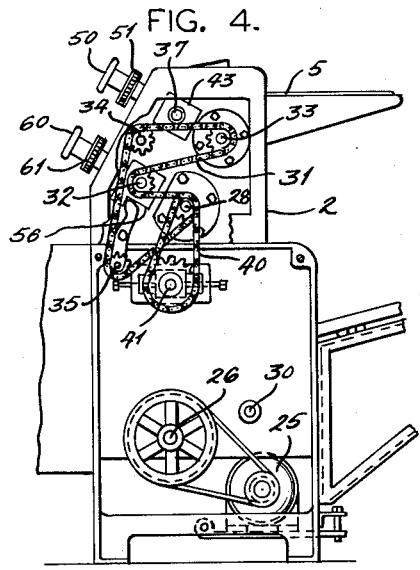
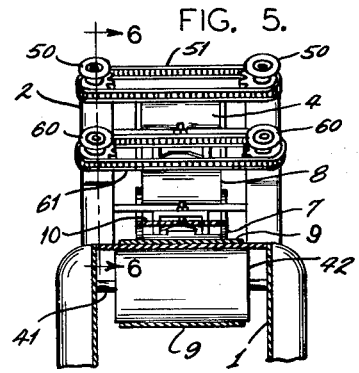
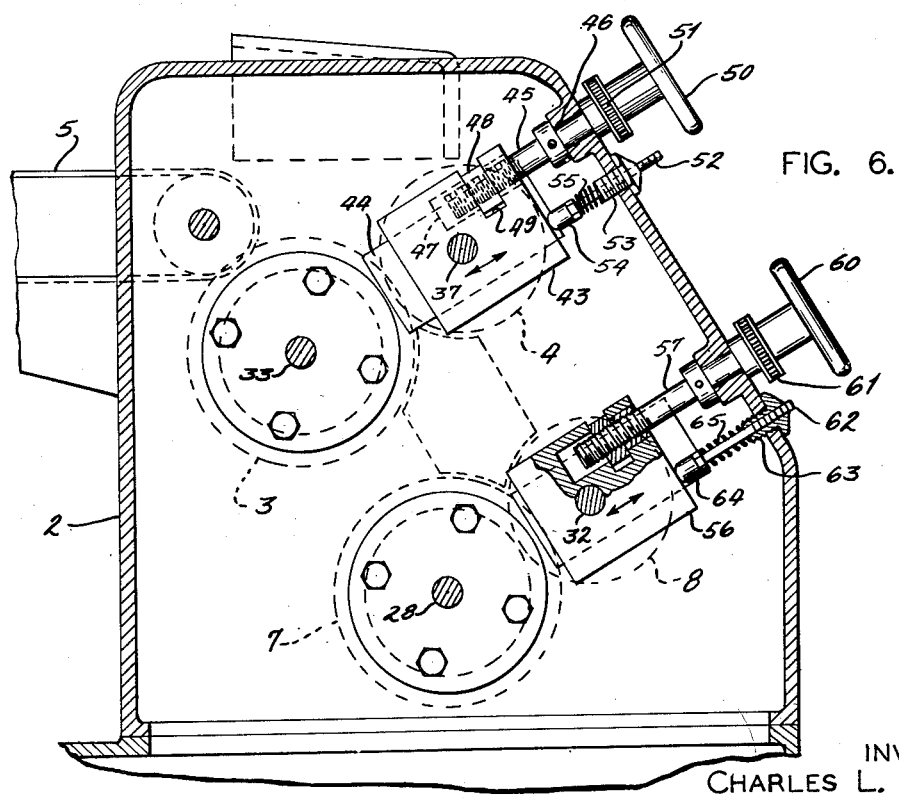
INVENTORS
CHARLES L. RUSSELL
GUSTAVE H. STEINMEYER
ATTORNEYS.

United States Patent Office 2,706,034
Patented Apr. 12, 1955

2,706,034

CONVEYOR MECHANISM FOR DOUGH FORMING MACHINES

Charles L. Russell, Kirkwood, and Gustave H. Steinmeyer, Affton, Mo., assignors, by mesne assignments, to Read Standard Corporation, a corporation of Delaware Application July 16, 1949, Serial No. 105,164

1 Claim. (Cl. 198—204)

It is the object of the present invention, generally stated, to improve the above-mentioned apparatus and adapt it for the production of different sizes of loaves, and to the handling of pans of different lengths.

Another object is to provide improved gauging means whereby the accuracy of operation of the machine is improved.

Further objects will appear from the following description, in which will be set forth an illustrative embodiment of this invention. It is to be understood, however, that this invention is susceptible of various embodiments, within the scope of the appended claim, without departing from the principles or spirit of the invention.

In accordance with this invention, generally stated, the machine is provided with a plurality of head rolls, between which a suitably pretreated dough ball may be rolled into a sheet preparatory to coiling the sheet into a loaf. With a dough ball of given mass, the area of the resultant sheet will be increased when the nip between cooperating rolls is reduced. The invention contemplates the provision of adjustment means for each set of head rolls, operating to concurrently adjust both ends thereof, and in addition provides a device for visually indicating the clearance between the rolls. By this means, the head rolls may be pre-set to produce sheets of the shape best adapted for the pans selected, and may be varied from time to time as it is desired to alter the size of the loaf. Moreover, the invention contemplates the provision of pan-handling mechanism, readily adjustable to accommodate pans of different sizes and to properly "spot" the same for reception of the formed loaf.

An illustrative embodiment of this invention is shown in the accompanying drawings, in which:

Figure 1 is a side elevation of a machine embodying this invention, with the side plate of the head portion removed;

Figure 2 is a vertical section of the machine taken on line 2—2 of Figure 3;

Figure 3 is a section on line 3—3 of Figure 2;

Figure 4 is a view of the side of the head portion opposite to that of Figure 2, with parts broken away;

Figure 5 is a partial section on line 5—5 of Figure 2;

Figure 6 is an enlarged section on line 6—6 of Figure 5; and

Figure 7 is an enlarged section on line 7—7 of Figure 2.

Referring now to the drawings, the machine comprises generally an elongated frame 1, on which the various parts are supported, one end of which carries an elevated head 2. This head has mounted therein a plurality of head rolls or sheeting rolls. In the embodiment illustrated, the upper pair of these rolls 3 and 4 is arranged below a small conveyor belt 5, by which a dough ball 6 may be delivered between said rolls. The dough piece is flattened by passing between the rolls 3 and 4 and then passes to a pair of lower rolls 7 and 8 whereby it is further compressed to a thin sheet. After passing through the rolls 7 and 8, the sheet of dough is received on a horizontal conveyor belt 9, moving toward the right in Figure 2. The first contact of the sheet with the conveyor curls the leading edge of the sheet in the direction of movement of the conveyor. As the conveyor carries the sheet along, this leading curled-up edge engages a flexible apron 10, of textile fabric or the like, which imposes a drag that causes the sheet to coil as the conveyor moves along. As the coiled dough passes out from under the apron 10, it engages a succession of stationary pressure boards 11 and continues rolling, under slightly increasing pressure by said board. Thereafter, the conveyor 9 carries it to the end of its travel.

Beneath the conveyor 9 is another conveyor comprising a pair of narrow belts 12 moving over a supporting plate 13 and rollers 14 and 15 at their opposite ends. A chute 16 is arranged to receive the empty baking pans 17 and deliver them onto the conveyor 12. On arriving at the end of the conveyor 12, the pans are stopped by a dog 18 on a lever 19, pivoted at 20, on the frame 1. The other end of this lever is connected by a link 21 to one arm 22 of a bell crank pivoted at 23 and having a portion 24 in the path of the formed loaf 6' as it arrives at the end of the conveyor 9. Further movement of the loaf 6' causes the bell crank to swing the lever 19 on its pivot so as to lower the dog 18 and permit the conveyor 12 to move the pan 17 to a position to receive the loaf as it drops from the end of the conveyor 9, after which the dog 18 rises again to intercept the next pan.

The power for operating the machine is derived from an electric motor 25 belted to drive a shaft 26, as seen in Figure 4. The other end of the shaft 26 is connected by a chain drive 27 (Figure 1) to the shaft 28 of the roll 7. The shaft 28 carries a second sprocket which is connected by a drive chain 29 to a sprocket on the shaft 30 which carries the rolls 14, to drive the conveyor belts 12. The shaft 28 drives the other head rolls as follows (Figure 4): A chain 31 passes from a sprocket on the shaft 28 successively over sprockets on the shaft 32 of the roll 8, the shaft 33 of the roll 3, an idler 34, a take-up 35 and back to the shaft 28. It will be noted that the shaft 33 is driven to rotate in the same direction as the shaft 28, while the shaft 32 rotates in the opposite direction. The other end of the shaft 32 (see Figure 1) is connected by a chain 36 to a sprocket on the shaft 37 of the roll 4, so that the rolls 4 and 8 rotate in the same direction which is opposite to that of the rolls 3 and 7. On this side of the machine a sprocket on the shaft 33 is connected by a chain 38 to a sprocket on the shaft 39 which drives the small conveyor 5. Also, as shown in Figure 4, a second sprocket on the shaft 28 is connected by a chain 40 with a sprocket on the shaft 41 which carries the end roll 42 of the conveyor 9, to drive that conveyor.

The shaft 37 is journaled at its ends in a pair of movable bearing blocks 43 each slidable on a guide block 44. An adjusting screw 45 journaled at 46 in the wall of the head 2 enters a passage 47 in each block 43 and engages a nut 48 seated in a recess 49 in the block 43, so that by rotation of the screw 45 by means of a handwheel 50 thereon the block 43 may be moved to slide along the guide block 44. A chain 51 passes around sprockets on the shanks of both screws 45, so that rotation of one causes equal rotation of the other, so as to keep the shaft 37 in alignment as the adjustment is made. The shaft 33 is fixed in position so that such adjustment changes the spacing between the rolls 3 and 4.

In order that the amount or extent of such spacing between the rolls 3 and 4 may be known to the operator, an indicator is provided in the form of a gauge rod 52 slidably supported in a guide sleeve 53 screwed into the wall of the head 2. The rod 52 is provided with a head 54 adapted to engage the block 43. A spring 55 surrounding the rod 52 and abutting against the sleeve 53 and the head 54 maintains said head in engagement with the block 43 in all positions of that block. Thus, the gauge rod moves with the block at all times. The rod may be provided with graduation marks, as shown in Figure 6, at any suitable spacing to enable the operator to determine accurately the spacing of the rolls. The shaft 32 of the roll 8 is similarly mounted in slidable bearing blocks 56 operable by screws 57 having hand wheels 60 and connected by a chain 61 for simultaneous operation. This roll also has a gauge rod 62 slidable in a guide sleeve 63 and is provided with a head 64 engaging the block 56 and controlled by a spring 65. Thus, the spacing of each pair of rolls may be indicated accurately.

In order to properly feed and position pans 17 of different lengths a plurality of transverse shafts 66, having right- and left-hand threads at their opposite ends, are suitably journaled on the frame of the conveyor 12. These shafts, spaced at suitable intervals along the conveyor, are threaded into supporting elements 67 extending downward from a pair of side rails 68, one of which extends along each side of the conveyor. Sprockets on these shafts are connected together in pairs by chains 69 and 70 so that all the shafts will rotate together. The last shaft at the end of the conveyor has a sprocket which is connected by a chain 71 to a sprocket on a manipulating shaft 72 which latter is provided with a crank handle 73 (Figure 1) by which it may be turned by hand. Thus by turning the crank 73 all the shafts 66 will be rotated in unison and their threaded engagement with the rails 68 will cause the latter to move toward or away from the conveyor by the same amount, as indicated by dotted lines in Figure 7, so that they will always be equidistant from the center line of the conveyor. At the receiving end of the conveyor the rails 68 have hinged thereto at 74 end sections 75. These end sections flare out laterally so as to extend outside of the side rails of the chute 16, as shown in Figure 3. In the arrangement illustrated they are controlled by spring 76 which urge them outward against the sides of the frame 1. They may, however, be urged in the opposite direction so as to bring these ends against the side rails of the chute 16. In either case they serve to compensate for any difference between the width of the chute 16 and the space between the rails 68, so as to guide the pans 17 from one to the other.

In accordance with this invention, therefore, the machine is so organized as to enable the operator to adjust it for most efficient operation with a variety of differently sized pans and loaves. By accurately indicating the setting of the head rolls, it makes it possible to adjust such setting to the optimum value according to the condition of the dough, the desired loaf size, and other conditions affecting the work and to duplicate such setting at different times when like conditions obtain. When different sizes of pans must be handled, the adjustment of the rails 68 may be made instantly, without interrupting the operation of the machine, and the jointed end sections 75 insure proper spotting of the pans to the conveyor 12, whatever the adjustment of the side rails.

Having thus described the invention, what is claimed and desired to be secured by Letters Patent is:

In a dough panning machine of the character described, an endless conveyor operating to deliver baking pans to a dough depositing station, a plurality of transverse shafts beneath the top run of said endless conveyor at spaced points therealong, said shafts having oppositely threaded end portions projecting beyond the opposite sides of said conveyor, a bracket supported by and threaded on each of said threaded shaft portions, a longitudinally extending upright guide member along each side of said conveyor supported by and secured to said brackets, means for rotating said shafts to move said guide members inwardly and outwardly of said conveyor, each of said guide members at the infeed end of said conveyor having a guide rail extension pivotally connected thereto, stop means adjacent the free ends of said extensions opposite their pivotally mounted ends for engagement by said free ends of said extensions, and biasing means biasing said free ends against said stop means whereby said free ends of said extensions are retained against said stop members while the pivotally mounted ends of said extensions are movable with said guide members.

References Cited in the file of this patent

UNITED STATES PATENTS

| | | |
|---|---|---|
| 894,307 | Zofnass | July 28, 1908 |
| 1,134,970 | Lawrence | Apr. 6, 1915 |
| 1,134,971 | Loose | Apr. 6, 1915 |
| 1,474,448 | Scott | Nov. 20, 1923 |
| 1,519,569 | Vicars | Dec. 16, 1924 |
| 1,753,393 | Van Houten | Apr. 8, 1930 |
| 1,781,546 | Harber | Nov. 11, 1930 |
| 1,828,324 | Kruse | Oct. 20, 1931 |
| 2,015,187 | Mayer | Sept. 24, 1935 |
| 2,246,949 | Parsons | June 24, 1941 |